(12) United States Patent
Newcomb et al.

(10) Patent No.: US 11,919,276 B2
(45) Date of Patent: Mar. 5, 2024

(54) TRANSPARENT COMPOSITE BODY PANELS WITH LOCALIZED STRUCTURAL REINFORCEMENTS FOR MOTOR VEHICLES

(71) Applicant: GM GLOBAL TECHNOLOGY OPERATIONS LLC, Detroit, MI (US)

(72) Inventors: Bradley A. Newcomb, Troy, MI (US); Julien P. Mourou, Bloomfield Hills, MI (US); Giles D. Bryer, Northville, MI (US); Joung Min Choi, Rochester Hills, MI (US); Thomas S. Prevost, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 713 days.

(21) Appl. No.: 17/141,524

(22) Filed: Jan. 5, 2021

(65) Prior Publication Data
US 2022/0212449 A1 Jul. 7, 2022

(51) Int. Cl.
*B32B 17/10* (2006.01)
*B32B 5/02* (2006.01)
(Continued)

(52) U.S. Cl.
CPC ......... *B32B 17/10366* (2013.01); *B32B 5/02* (2013.01); *B32B 5/024* (2013.01); *B32B 7/12* (2013.01); *B32B 17/10018* (2013.01); *B32B 17/10036* (2013.01); *B32B 17/10174* (2013.01); *B32B 17/10201* (2013.01); *B32B 17/1022* (2013.01); *B32B 17/1055* (2013.01);
(Continued)

(58) Field of Classification Search
CPC ........ B32B 17/10366; B32B 17/10018; B32B 17/10743; B32B 17/10201; B32B 17/1022; B32B 17/10036; B32B 17/1055; B32B 17/10174; B32B 7/12; B32B 2605/00; B32B 2260/021; B32B 2260/046; B62D 29/043; B62D 25/06
USPC ...................................... 428/411.1
See application file for complete search history.

(56) References Cited

U.S. PATENT DOCUMENTS

| 4,159,144 A | 6/1979 | Ehlen et al. |
| 4,892,351 A | 1/1990 | Ono et al. |

(Continued)

*Primary Examiner* — Michael M. Bernshteyn
(74) *Attorney, Agent, or Firm* — Quinn IP Law

(57) ABSTRACT

Presented are multilayer composite panels for motor vehicles, methods for making/using such panels, and motor vehicles with transparent composite roof panels having localized reinforcement features. A sandwich-type multilayer composite panel contains one or more exterior layers each including a transparent rigid material, one or more bonding layers each including a transparent adhesive material, and one or more structural reinforcement layers each including a fiber-reinforced polymer material. Each structural reinforcement layer may be attached directly to a bonding layer and/or exterior layer. The composite panel may also include one or more IR-reflective layers, one or more light-absorbing sunshade layers, and one or more insulating low-k layers. The multilayer body panel has a plan-view profile; the individual layers extend substantially the entire length and width of the plan area, whereas the fibers in each structural reinforcement layer are localized to one or more discrete regions within the plan-view profile.

20 Claims, 7 Drawing Sheets

(51) Int. Cl.
  *B32B 7/12* (2006.01)
  *B62D 25/06* (2006.01)
  *B62D 29/04* (2006.01)

(52) U.S. Cl.
  CPC ...... *B32B 17/10743* (2013.01); *B62D 29/043* (2013.01); *B32B 2260/021* (2013.01); *B32B 2260/046* (2013.01); *B32B 2605/00* (2013.01); *B62D 25/06* (2013.01)

(56) References Cited

U.S. PATENT DOCUMENTS

| | | |
|---|---|---|
| 4,988,142 A | 1/1991 | Chandler et al. |
| 8,814,258 B2 | 8/2014 | Comfort et al. |
| 8,925,286 B2 | 1/2015 | Hagen et al. |
| 8,926,004 B2 | 1/2015 | Betzen et al. |
| 9,227,673 B2 | 1/2016 | Berger et al. |
| 9,290,084 B2 | 3/2016 | Bojanowski et al. |
| 9,340,096 B2 | 5/2016 | Bojanowski |
| 9,994,091 B2 | 6/2018 | Kaphengst et al. |
| 10,293,668 B1 | 5/2019 | Foss et al. |
| 11,358,647 B1* | 6/2022 | Newcomb .............. B62D 25/04 |
| 11,383,771 B1* | 7/2022 | Newcomb ............. B62D 29/005 |
| 2007/0182217 A1 | 8/2007 | Saleen et al. |
| 2011/0248525 A1 | 10/2011 | Lundstroem |
| 2019/0105972 A1* | 4/2019 | Kim .......................... B60J 7/11 |
| 2019/0146216 A1* | 5/2019 | Mourou .................... B60J 1/02 280/781 |
| 2021/0245809 A1* | 8/2021 | Saje ....................... B62D 21/10 |

* cited by examiner

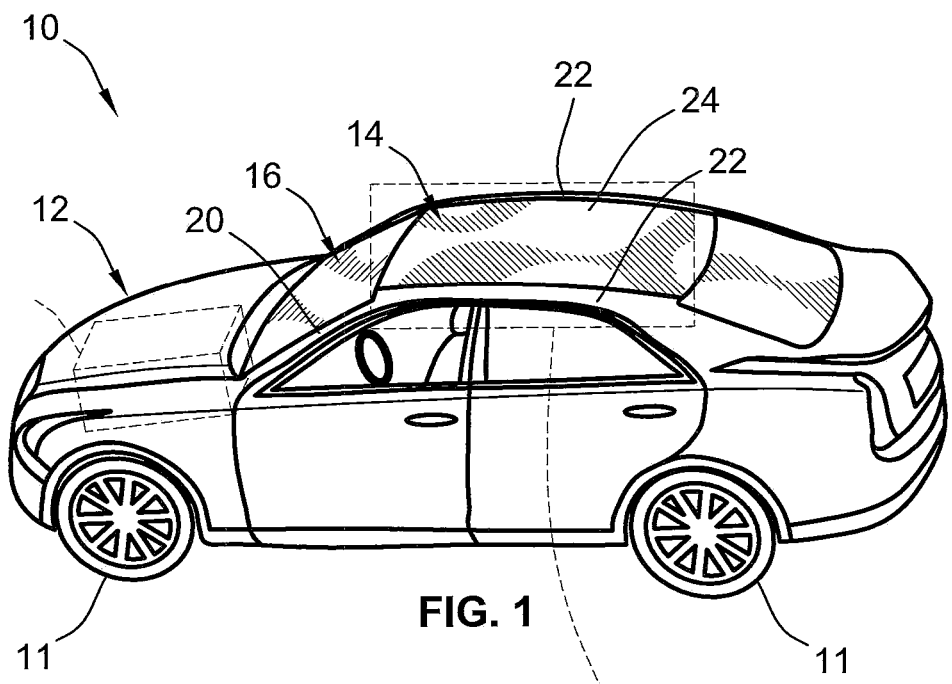
FIG. 1
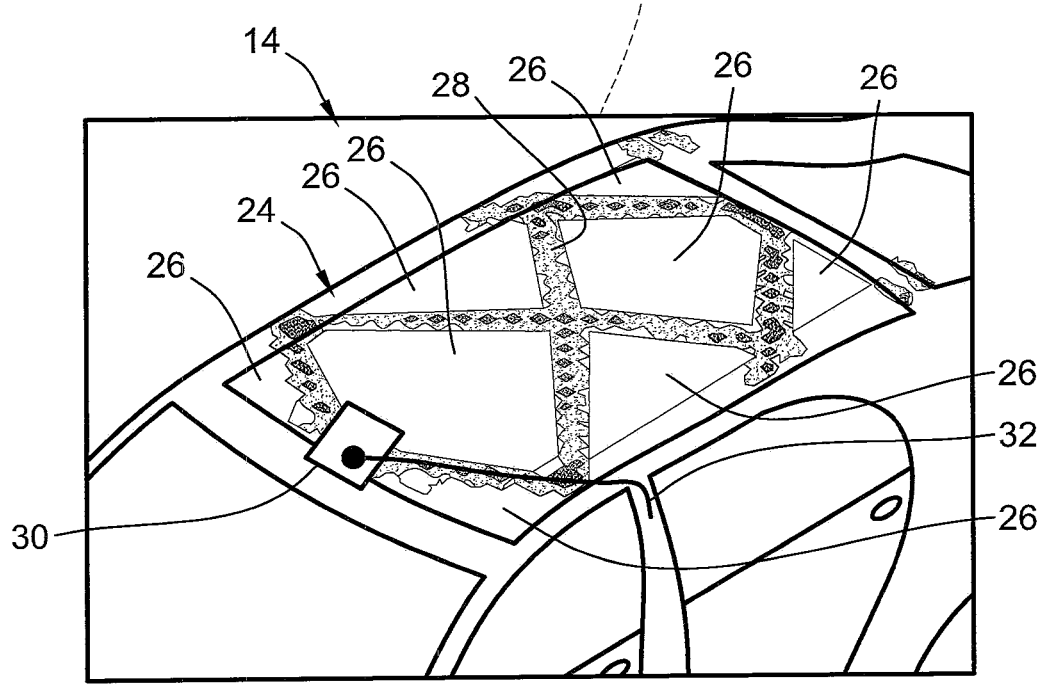

TRANSPARENT COMPOSITE BODY PANELS WITH LOCALIZED STRUCTURAL REINFORCEMENTS FOR MOTOR VEHICLES

INTRODUCTION

The present disclosure relates generally to body panels for motor vehicles. More specifically, aspects of this disclosure relate to transparent roof panels for moonroof and panoramic roof assemblies of motor vehicles.

Most current production motor vehicles, such as the modern-day automobile, are erected on a rigid vehicle body—either as a body-on-frame or a unibody construction—with an interior passenger compartment that seats and safeguards the vehicle occupants. In automotive applications, driver-side and passenger-side door assemblies are movably mounted to port and starboard flanks of the vehicle body to provide controlled access to the passenger compartment and to provide lateral visibility through accompanying door windows. A rear window or back glass seals off, yet provides visibility through, a rearward end of the passenger compartment. Mounted between the forward A-pillars of the vehicle body is a windshield that provides an aerodynamically formed window through which the driver views the roadway while preventing unwanted ingress of wind, rain, and debris. Modern windshields, side and rear windows, and glass panel roofs are generally formed as a laminated glass construction composed of a multilayer assembly with a plastic interlayer, typically of polyvinyl butyral (PVB) or ethylene-vinyl acetate (EVA), which is laminated between two or more curved sheets of tempered glass.

SUMMARY

Presented herein are multilayer composite panels for motor vehicles, methods for making and methods for using such panels, and motor vehicles equipped with transparent composite roof panels having selectively located reinforcement features. By way of example, a structural transparent composite roof with localized opaque reinforcement sections is presented, e.g., for a panoramic "glass roof" automobile. The transparent composite roof panel may be a laminated sandwich construction with three or more layers, including: one or more scratch-resistant exterior layers; one or more thermoplastic or thermoset fiber reinforced polymer (FRP) layers; one or more optical bond layers; one or more infrared (IR) reflective layers; one or more solid-state, light absorbing sunshade layers; one or more electrically insulating low-k coating layers; and/or one or more chemically strengthened or soda-lime glass layers. The sequential order, individual and collective thicknesses, and respective contents of the layers may be varied depending, for example, on the intended application of the multilayer composite panel.

The structural integrity and transparency level of the composite panel may be controlled by the contents and composition of reinforcing fibers incorporated into the FRP layer(s) of the panel's multilayer construction. Load-bearing aspects of a transparent composite roof, for example, may be dictated by the local and directional application of high-volume-fraction fibers in a prefabricated fiber-weave mat (preform), a multidirectional pre-impregnated (prepreg) layup, or unidirectionally applied fiber tows, which is derived by load path optimization through finite element control. The transparent composite roof may be a tripartite laminate that consists essentially of three layers, or may consist essentially of five layers, nine layers, ten layers, or eleven layers. The foregoing composite panels help to improve occupant visibility while increasing occupant-perceived spaciousness without compromising the roof's structural integrity or increasing gross vehicle weight (GVW).

For vehicular roof applications, the vehicle body may be fabricated with an optimized roof support structure to provide subjacent support for the transparent composite roof panel. The roof support structure is composed of longitudinally elongated, laterally spaced roof side rails and laterally elongated, longitudinally spaced front and rear roof headers. Opposing ends of the roof headers are mounted to inboard surfaces of the roof side rails to cooperatively define a roof window frame with a central opening. The roof panel is securely mounted onto the roof window frame to cover the central opening. Traditional cross-car reinforcement bows located between the front and rear roof headers may be eliminated from the roof support structure and replaced by the localized FRP reinforcement sections within the laminate composite roof panel. The high-volume-fraction fibers may be arranged within the multilayer laminate composite such that each internal, localized FRP reinforcement is isolated to a diamond lattice-shaped plan-view region, a U-shaped plan-view region, and other plan-view profiles containing symmetrical, asymmetrical, simple, and complex shapes and patterns. These plan-view regions have at least two longitudinally elongated side rail segments that are interconnected by one or more transversely oriented cross-member segments.

Aspects of this disclosure are directed to sandwich-type multilayer composite panel structures, including methods for manufacturing and methods for utilizing such panel structures. In an example, a multilayer body panel for a motor vehicle is fabricated with at least one exterior layer that is formed, in whole or in part, from an optically transparent, rigid material. At least one bonding layer is attached, either directly or indirectly, to the exterior layer and is formed, in whole or in part, from a transparent adhesive material. The multilayer body panel also includes at least one structural reinforcement layer that is attached, directly or indirectly, to the bonding layer(s) and the exterior layer(s). The structural reinforcement layer includes a fiber-reinforced polymer material. The multilayer body panel has a plan-view profile with a length and width defining a plan-view area. The individual layers of the body panel may extend substantially the entire length and width of the body panel. In contrast, the fibers within each structural reinforcement layer are confined to one or more discrete regions within the plan area of the panel. Disclosed panel structures may be incorporated into any logically relevant component of a motor vehicle and may be utilized for automotive and non-automotive applications alike.

Additional aspects of this disclosure are directed to motor vehicles equipped with transparent composite panels having selectively located reinforcement features. As used herein, the terms "vehicle" and "motor vehicle" may be used interchangeably and synonymously to include any relevant vehicle platform, such as passenger vehicles (ICE, BEV, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, electric bicycles ("ebikes"), etc. In an example, a motor vehicle includes a vehicle body with a passenger compartment, multiple road wheels mounted to the vehicle body, and other standard original equipment. A prime mover, which may be in the nature of an engine assembly (e.g., for internal combustion engine (ICE) powertrains), an electric traction motor (e.g., for full-electric vehicle (FEV) powertrains), or both an engine assembly and a traction motor (e.g., for hybrid electric vehicle (HEV) powertrains), selectively drives one or more of the road wheels to thereby propel the vehicle.

Continuing with the discussion of the above example, the vehicle also includes a multilayer body panel that is mounted on the vehicle body and covers at least a portion of the passenger compartment. The multilayer body panel includes an exterior layer that includes a transparent rigid material, and a bonding layer that is attached to the exterior layer and includes a transparent adhesive material. A structural reinforcement layer, which is attached to the bonding and exterior layers, includes a fiber-reinforced polymer material. The multilayer body panel has a plan-view profile with a plan area; the individual layers extend substantially the entire length and width of the plan area, whereas the fibers in the structural reinforcement layer are localized to a discrete region within the plan area.

For any of the disclosed panels, methods, and vehicles, a reflector layer may be attached directly to one side of a bonding layer. The reflector layer is formed, in whole or in part, from an IR-reflective material. The IR-reflective material may include a metallic material (e.g., particulate silver (Ag), gold (Au), copper (Cu), aluminum (Al), etc.) and/or a dielectric material (e.g., $TiO_2$, $SiO_2$, etc.). As a further option, a sunshade layer may be attached directly to one side of a bonding layer, e.g., opposite that of the reflector layer. The sunshade layer is formed, in whole or in part, from a solid-state, visible (VIS) light and IR-light absorbing material. The light absorbing material may include an electrochromic polymer-dispersed liquid crystal (PDLC) material and/or an indium tin oxide (ITO) based electrochromic material. The transparent rigid material of the exterior layer(s) may include a scratch-resistant hard coat, whereas the transparent adhesive material of the bonding layer(s) may include an ethylene-vinyl acetate or polyvinyl butyral optical bonding agent. As yet a further option, the FRP material of the structural reinforcement layer(s) may include a fiber-weave preform entrained within a thermoset or thermoplastic matrix.

For any of the disclosed panels, methods, and vehicles, an optional low-k layer may be attached, e.g., indirectly by a bonding layer, to the sunshade layer. The low-k layer is formed, in whole or in part, from a dielectric material with a relatively small dielectric constant (e.g., small relative to the dielectric constant of silicon dioxide). Optionally, the multilayer composite panel may include a second bonding layer that is attached, directly or indirectly, to the low-k layer, and a second reflector layer that is attached, directly or indirectly, to the second bonding layer. An optional second structural reinforcement layer with the FRP material may be attached, directly or indirectly, to the second reflector layer. This additional structural reinforcement layer is localized to the same discrete region(s) within the plan area.

For any of the disclosed panels, methods, and vehicles, the multilayer composite panel may consist essentially of eleven layers that are stacked sequentially as: an exterior layer, a structural reinforcement layer, a bonding layer, a reflector layer, another bonding layer, a sunshade layer, yet another bonding layer, another reflector layer, a low-k layer, an additional bonding layer, and another structural reinforcement layer. A bonding layer and/or a reflector layer may be removed from the foregoing assembly to form 9-layer and 10-layer configurations. A multilayer composite panel may consist essentially of ten layers that are stacked sequentially as: an exterior layer, a reflector layer, a bonding layer, a sunshade layer, a structural reinforcement layer, another bonding layer, another reflector layer, yet another bonding layer, a low-k layer, and another exterior layer.

For any of the disclosed systems, methods, and vehicles, the multilayer composite panel may consist essentially of three layers (glass-FRP-glass) or may consist essentially of five layers (glass-bond-FRP-bond-glass). For five-layer constructions, the first bonding layer is attached directly to and sandwiched between the first exterior layer and the structural reinforcement layer. In this instance, the multilayer composite panel includes a second exterior layer material and a second bonding layer that is attached directly to and sandwiched between the second exterior layer and the structural reinforcement layer. For the three-layer and five-layer configurations, the transparent rigid material of the two exterior layers includes a chemically strengthened glass or a soda-lime glass, the transparent adhesive material of the two bonding layers includes an EVA or PVB-based optical bonding agent, and the FRP material of the center reinforcement layer includes a fiber-weave preform entrained within a thermoset or thermoplastic matrix.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 1 is an elevated, perspective-view illustration of a representative motor vehicle with an example of a multilayer transparent composite roof panel with internal FRP reinforcements in accordance with aspects of the present disclosure.

Figure 2:
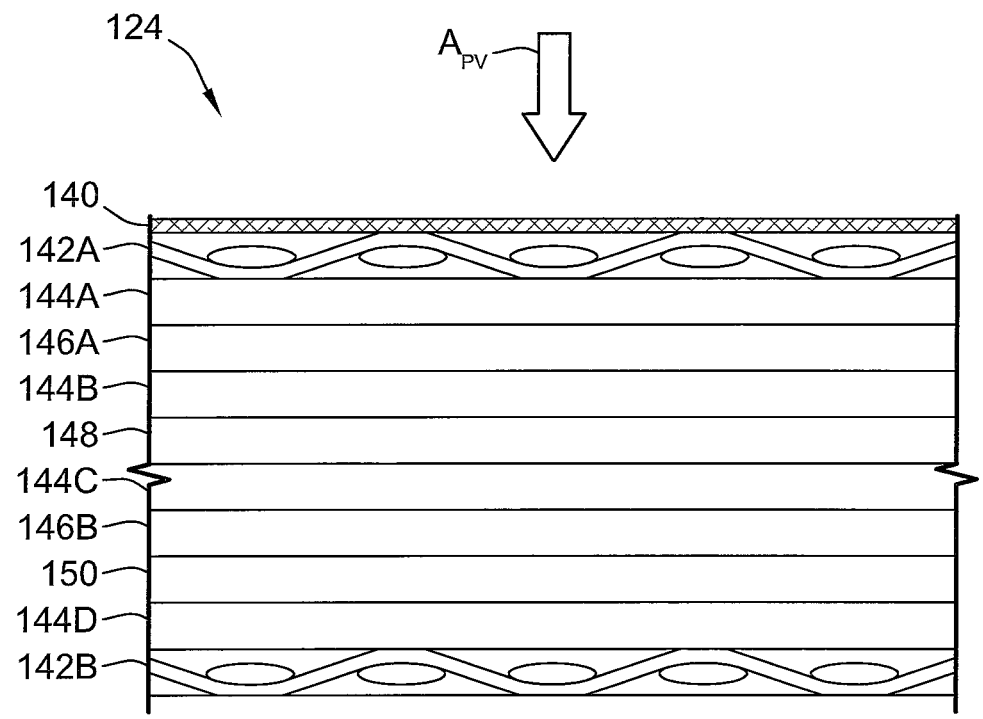
FIG. 2 is a schematic, side-view illustration of a select section of a representative 11-layer laminated transparent composite roof panel with localized FRP reinforcements in accord with aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style passenger vehicle. The illustrated automobile 10—also referred to herein as "motor vehicle" or "vehicle" for short—is merely an exemplary application with which novel features of this disclosure may be practiced. In the same vein, implementation of the present concepts into a panoramic "glass roof" assembly should also be appreciated as an exemplary application of some of the novel concepts disclosed herein. As such, it will be understood that aspects and features of the present disclosure may be applied to other vehicle body panels, may be incorporated into any logically relevant type of motor vehicle, and may be implemented for automotive and non-automotive applications alike. Moreover, only select components of the motor vehicles and body panels are shown and described in additional detail herein. Nevertheless, the vehicles and panels discussed below may include numerous additional and alternative features, and other available peripheral components, for carrying out the various functions of this disclosure.

Automobile 10 of FIG. 1 includes a vehicle body 12 that is erected on a rigid vehicle frame 20, for example, as either a body-on-frame or a unibody construction in a three-box configuration. Front and rear road wheels 11 are operatively attached to the vehicle frame 20, e.g., via individual corner assemblies. In order to propel the vehicle, the road wheels 11 are driven by a prime mover 18, which may be in the nature of an internal combustion engine assembly and/or one or more electric traction motors. Located aft of a front compartment (e.g., engine bay) and forward of a rear compartment (e.g., trunk or battery compartment) is an interior passenger compartment 16 of the vehicle body 10 that seats and safeguards the vehicle occupants. A rigid roof structure 14 generally delimits the upper extent of the passenger compartment 16, shielding the driver and passengers from rain, snow, ultraviolet (UV) light, and other elements. In accord with the illustrated example, the roof structure 14 is generally composed of laterally spaced roof rails 22 that are interconnected with longitudinally spaced front and rear headers. The roof rails 22 and roof headers cooperatively provide subjacent support for a transparent roof panel 24 (traditional cross-car reinforcement bows may be eliminated from the roof support structure). The roof structure 14, including the rails 22, braces, and roof panel 24, extends over and across the upper boundary of the passenger compartment 16. As illustrated, the transparent roof panel 24 has a "panoramic" design in that it extends across the entire fore-aft length of the vehicle roof and, thus, provides vehicle occupants with a predominantly unobstructed view through the top of the vehicle 10.

Inset within FIG. 1 is an enlarged, perspective-view illustration of the vehicle roof structure 14 to provide a more detailed look at the structural transparent composite roof panel 24. From a plan-view perspective, the composite roof panel 24 has eight substantially transparent sections 26 that are separated by a diamond lattice-shaped reinforcement section 28 that is translucent or opaque. It should be appreciated that the number, shape, size, and arrangement of the transparent sections 26 and opaque/translucent sections 28 may be varied from that which are shown in the drawings without departing from the intended scope of this disclosure. An optional sensor farm 30 may be located at a forward end of the roof structure 14 and, if desired, embedded within the roof panel 24. The sensor farm 30 may comprise an assortment of sensing devices, including one or more digital cameras, radar transmitters/receivers, LiDAR phased array and laser emitter, rearview mirror camera, etc. An electrical wiring harness 32 for the sensor farm 30 may pass within a high-fiber-fraction region of the composite roof panel 24 to conceal the wires from the occupants and passersby.

As will be explained in further detail below, the transparent composite roof panel 24 has a laminated, sandwich-type construction with orthotropic properties and load path optimization enabled by localized FRP reinforcement features. The structural integrity and overall level of optical transparency of the composite panel may be controlled by the contents and arrangement of reinforcing fibers incorporated into the FRP layer or layers of the panel's multilayer construction. Load path optimization with limited panel transparency may be governed, for example, by an FRP composite layer with: an FRP-layer lateral width of less than approximately 80-100 millimeters (mm) and an FRP-layer total vertical thickness of about 0.25 mm to about 4.75 mm; a local high volume fraction ($V_f$) of fibers of about 0.5; a reinforcing fiber total width that is less than an average pupillary spacing (e.g., about 52 mm); and an optical transparency of the FRP region(s) of less than about 5%. For at least some embodiments, a total vertical thickness of the laminate composite panel is substantially constant along the length and width of the panel. Likewise, a total vertical thickness of an FRP-composite layer is substantially constant along the length and width of the panel; however, the fibers within the FRP-composite layer are localized to one or more discrete regions and, thus, are not present at every location along the length and width of the panel.

FIG. 2 schematically illustrates a first example of a structural transparent composite panel 124 that may be implemented for the vehicle roof panel 24 of FIG. 1. In accord with the illustrated example, the composite panel 124 (also referred to herein as "body panel" or "roof panel" for automotive applications) is a multilayer sandwich-type construction composed of at least eleven (11) layers: an uppermost exterior layer 140; a pair of structural reinforcement layers 142A and 142B; four bonding layers 144A, 144B, 144C and 144D; a pair of reflector layers 146A and 146B; a sunshade layer 148; and an insulating low-k layer 150. In at least some embodiments, all eleven of the foregoing layers are coextensive with and, thus, span substantially the entirety of one another. Alternatively, one or more select layers of disclosed multilayer composite panel structures may take on distinctive shapes, sizes, and/or locations. It should also be noted that any reference to "first", "second", "third", etc., in the specification and claims does not per se act as a serial limitation or a numerical limitation but, instead, may be provided to distinguish between or to more easily identify the various members of a group.

The structural transparent composite panel 124 may consist essentially of the eleven illustrated layers, ordered from top-to-bottom in the sequence that is presented in FIG. 2. In this instance, additional features and layers may be incorporated into the composite panel 124 so long as any such additions do not materially affect the load-path optimization and optical transparency characteristics of the multilayer construction. It is further contemplated that the composite panel 124 may comprise greater or fewer layers than the eleven layers enumerated above. As an example, one or both of the reflector layers 146A, 146B may be removed, one or more of the bonding layers 144A-144D may be removed; and/or the exterior layer 140 may be removed. Examples of additional or alternative layers may include, singly, collectively, or in any combination, a window heat strip ("defroster") layer, an anti-glare layer, chemically strengthened or soda-lime glass layers, a second exterior layer located opposite the uppermost exterior layer 140 to act as a lowermost layer, etc. It should be noted that use of the term "layer" in the description and claims is inclusive of but does not necessarily require that a particular segment of the composite construction be a continuous sheet or otherwise span the entirety of the panel.

With continuing reference to FIG. 2, the uppermost exterior layer 140 and the second structural reinforcement layer 142B are positioned in parallel spaced arrangement as the outermost layers of the composite panel 124, thus sandwiching therebetween the remaining nine panel layers. According to the illustrated architecture, the first structural reinforcement layer 142A is sandwiched between and attached directly to the uppermost exterior layer 140 and the first bonding layer 144A. In the same vein, the first reflector layer 146A is sandwiched between and attached directly to the first and second bonding layers 144A, 144B, whereas the sunshade layer 148 is sandwiched between and attached directly to the second and third bonding layers 144B, 144C. The second reflector layer 146B is sandwiched between and attached directly to the third bonding layer 144C and the low-k layer 150. The low-k layer 150 is adhered to the inside surface of the second structural reinforcement layer 142B via the fourth bonding layer 144D. In an 11-layer configuration, the composite panel 124 may have a total thickness of about 1.5 mm to about 15.5 mm or, in at least some embodiments, about 2.25 mm to about 12 mm. It is envisioned that the order of the illustrated layers may be modified from that which is shown in the drawings without departing from the intended scope of the present disclosure.

To provide functional UV and scratch protection, the uppermost exterior layer 140 of the composite panel 124 may be formed, in whole or in part, from a rigid yet transparent material. This transparent, rigid material may include a wear-resistant and scratch-resistant hard coating with a thickness ranging from a few microns to about 0.1 mm. In a more specific example, the exterior layer 140 is a silicone hard coat with a film encased between a poly (methyl methacrylate) (PMMA) sheet and a transparent polycarbonate (PC) sheet. Alternatively, the uppermost exterior layer 140 is a clear coat film that provides an optically transparent, scratch-resistant "Class A" surface.

Four optical bonding layers 144A-144D function to operatively connect the individual layers of the 11-layer composite panel 124 to one another without impeding the optical characteristics of the panel 124. Each bonding layer 144A-144D may be formed, in whole or in part, from a transparent adhesive material offering at least about 75-90% transparency, for example. This transparent adhesive material may include a thermoset ethylene-vinyl acetate (EVA) optical bonding agent or a thermoplastic polyvinyl butyral (PVB) optical bonding agent. The bonding layers 144A-144D may each have an individual thickness of about 0.5 mm to about 1 mm or, in at least some embodiments, about 0.8 mm for a total optical bonding thickness of about 3.2 mm or less. One or more of the bonding layers 144A-144D may be integrated within one or more of the structural reinforcement layers 142A, 142B.

Continuing with the discussion of the structural transparent composite panel 124 of FIG. 2, the two reflector layers 146A, 146B help to radiation-borne mitigate thermal loading on the passenger compartment 16 and, at the same time, on the occupants of the vehicle 10. Each reflector layer 146A, 146B may be formed, in whole or in part, from an infrared (IR) reflective material offering at least 65-85% reflectance, for example. This IR-reflective material may include a metallic material (e.g., an aluminum, gold, or silver film) and/or a dielectric material (e.g., oxides of titanium, tantalum, zirconium, hafnium, scandium, and niobium). Optional pigments and dyes, such as EPOLIGHT™ notch-absorbing dye, may be used as an additive in a polymeric matrix for the IR-reflective material. The reflector layers 146A, 146B may each have an individual thickness of about 75 to about 150 nanometers (nm) or, in at least some embodiments, about 100 nm for a total IR reflector thickness of about 200 nm or less. Each IR reflector layer 146A, 146B may be a PET film with a low-emissive, silver-based sputter coating.

The center layer of the multilayer composite panel 124 is a sunshade layer 148 that selectively provides maximum light absorption. Sunshade layer 148 of FIG. 2 may be formed, in whole or in part, from a solid-state, visible (VIS) light absorbing and IR-light absorbing material. This solid-state, light-absorbing material may include an electrochromic polymer-dispersed liquid crystal (PDLC) material and/or an indium tin oxide (ITO) based electrochromic material. PDLCs, for example, are liquid crystal dispersions within a polymer matrix; these films can be switched between an opaque state and a transparent state by applying a suitable alternating current (AC) electric field. The sunshade layer 148 may have a total thickness of about 0.05 mm to about 0.15 mm or, in at least some embodiments, about 0.1 mm.

The sunshade layer 148 may be a solid-state EC film (e.g., for visual glare reduction or further IR control) with a vapor barrier.

Attached to an interior-facing surface of the second reflector layer 146B is an optional low-k coating layer 150, namely an interlayer of transparent dielectric material with a low dielectric constant (e.g., a k value of about 3.6 or less). The low-k layer 150 may function as an insulating dielectric that separates the occupants of the passenger compartment 16 from electrically conductive elements within the composite panel 124, such as the magnetic field used to operate the sunshade layer 148. In addition, the low-k layer 150 may help to reduce the amount of heat escaping from a vehicle passenger compartment while remaining sufficiently transparent so as to not degrade the optical transparency of the panel 124. This low-k layer 150 may have a thickness of about 75 nm to about 125 nm or, in at least some embodiments, about 100 nm. Optional configurations may altogether eliminate the low-k coating layer 150 from the laminate stackup.

Disposed at opposing top and bottom sides of the composite panel 124 of FIG. 2 are outer and inner structural reinforcement layers 142A, 142B, respectively, that govern the panel's structural rigidity and local transparency level. Each reinforcement layer 142A, 142B is formed, in whole or in part, as a fiber reinforced polymer (FRP) composite with a fiber filler embedded within a polymer matrix. For instance, the FRP material may include a fiber-weave preform that is entrained within a thermoset or thermoplastic matrix to collectively provide localized opacity or a layer-level transparency of no more than about 5-20%, for example. FRP fibrous materials may be composed of carbon fibers, glass fibers, aramid fibers, basalt fibers, and/or any other suitable reinforcing fiber, which may be arranged unidirectionally, bidirectionally, or multi-directionally. The fiber composition may be woven or compacted, and subsequently cut into a generally flat mat or roving. The FRP composite material may optionally contain one or more additives and a protective hard coating. These structural reinforcement layers 142A, 142B may each have an individual thickness of about 1 mm to about 3 mm or, in at least some embodiments, about 2 mm for a total FRP composite thickness of about 4 mm or less. There are possibilities where an embedded glass fiber may act as a structural reinforcement while also having high transparency (e.g., up to 80% transparent in some cases).

Fiber spacing and orientation within each FRP composite layer may be used to tailor the level of optical transparency of the composite panel 124. By way of non-limiting example, an FRP structure with a high fiber volume fraction results in a lower overall optical transparency, whereas an FRP structure with a lower fiber volume fraction results in a greater overall transparency. Utilizing a local high volume fraction of about 0.5 with a total width that is less than an average fiber pupillary spacing (e.g., about 50-100 mm), the structural reinforcement layers 142A, 142B may achieve an optical transparency of less than 5%. Moreover, the composite matrix material may be selected to affect a desired level of transparency. For instance, a PMMA matrix would provide greater optical transparency as compared to a thermoset resin matrix that would offer significantly less transparency.

Additives may be incorporated into the structural reinforcement layers 142A, 142B to minimize or otherwise eliminate UV degradation of the fiber reinforced composite matrix. Ultraviolet absorbers act as a type of light stabilizer that functions by competing with the chromophores to absorb UV radiation. Absorbers change harmful UV radiation into harmless infrared radiation or heat that is dissipated through the polymer matrix. Some examples of UV absorbers include, but are certainly not limited to, carbon black, rutile titanium oxide, hydroxybenzophenone, hydroxyphenylbenzotriazole, oxanilides for polyamides, benzophenones for PVC, and benzotriazoles and hydroxyphenyltriazines for polycarbonate. Other additives that help to prevent UV degradation include quenchers, which are used to return excited states of chromophores to ground states by an energy transfer process. Nickel quenchers are a commercially available type used in film production. As an alternative to quenchers, Hindered Amine Light Stabilizers (HALS) are long-term thermal stabilizers that act by trapping free radicals formed during the photo-oxidation of a plastic material and thus limiting the photodegradation process. Absorbers, quenchers, and HALS all function by different mechanisms; as such, they may be combined into synergistic UV absorbing additives. For example, benzotriazoles may be combined with HALS to protect pigmented systems from fading and color changes.

The reinforcement layers 142A, 142B function as localized opaque or translucent reinforcements for the transparent composite panel 124. In particular, the composite panel 124 has a plan-view profile—represented in FIG. 2 via plan-view arrow $A_{PV}$—with a plan area defined by the panel's transverse width and fore-aft length. As used herein, the term "plan view" may be defined to include a 2-dimensional view (e.g., an orthographic projection) of a 3-dimensional object as seen from vertically above. With collective reference to the inset view of FIG. 1 and the side view of FIG. 2, the exterior layer 140, bonding layers 144A-144D, reflector layers 146A, 146B, sunshade layer 148, and low-k layer 150 all extend substantially the entire length and width of the plan area and, thus are coterminous with the plan-view profile of the composite panel 124. The structural reinforcement layers 142A, 142B, on the other hand, are localized to one or more discrete regions within the panel's plan-view area (e.g., reinforcement section 28 of FIG. 1). In other words, the reinforcement layers 142A, 142B do not extend the entire length and/or the entire width of the plan area; rather, each reinforcement layer 142A, 142B is delimited to a specific area or specific areas of the panel structure. According to the example portrayed in FIG. 1, each of the reinforcement layers 142A, 142B may take on a diamond-shaped lattice pattern. This lattice pattern may be complementary with an optimized roof rail support structure of a vehicle body that provides subjacent support to the composite panel when operatively mounted onto the vehicle. It is envisioned that the reinforcement layers 142A, 142B take on alternative shapes, sizes, and locations, including other desired shapes and patterns, as described below with reference to FIGS. 6-13.

Figure 3:
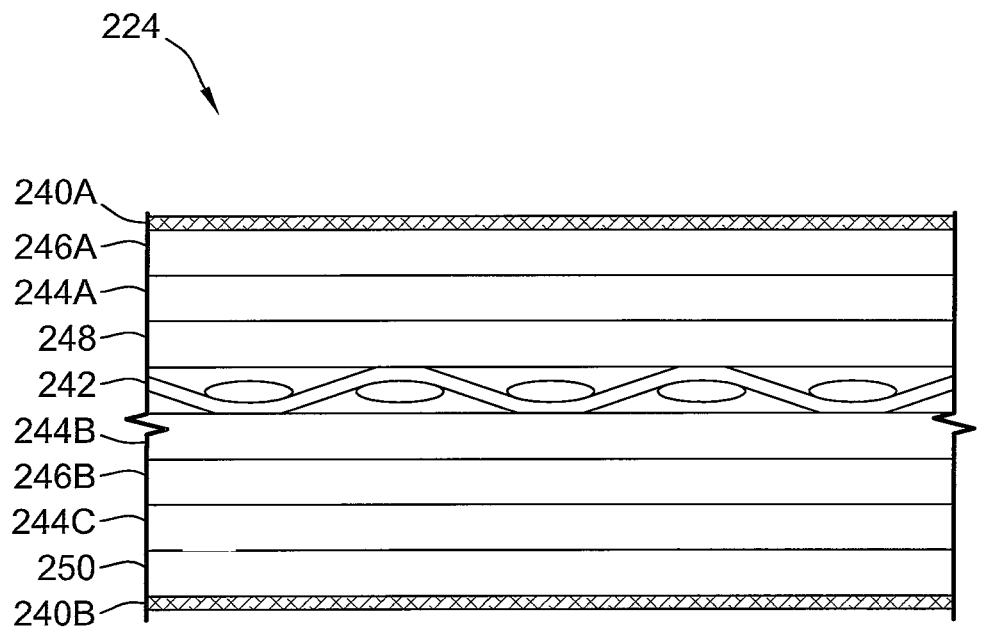
FIG. 3 is a schematic, side-view illustration of a select section of a representative 10-layer laminated transparent composite roof panel with localized FRP reinforcements in accord with aspects of the disclosed concepts.

Turning next to FIG. 3, there is shown a second example of a structural transparent composite panel 224 that may be utilized, for example, as a vehicle body or roof panel. Although differing in appearance, it is envisioned that any of the features and options described above with reference to the composite panel 124 of FIG. 2 can be incorporated, singly or in any combination, into the composite panels 224, 324 and 424 of FIGS. 3-5, and vice versa. In accord with the illustrated example, the composite panel 224 is a multilayer sandwich-type construction composed of at least ten (10) layers: uppermost and lowermost exterior layers 240A and 240B, respectively; a central structural reinforcement layer 242; three bonding layers 244A, 244B and 244C; a pair of reflector layers 246A and 246B; a sunshade layer 248; and a low-k layer 250. Each of the foregoing layers may take on any of the characteristics described above with respect to its corresponding layer(s) in FIG. 2. Similar to the architecture of FIG. 2, all 10 of the above-itemized layers are coextensive with one another, having substantially the same length and width. However, the fibers contained in the structural reinforcement layer 242 are localized to one or more select regions and, thus, have a distinct shape and distinct measurements as compared to the composite layers.

The structural transparent composite panel 224 may consist essentially of the ten illustrated layers, ordered from top-to-bottom in the sequence that is presented in FIG. 3. The uppermost and lowermost exterior layers 240A, 240B are positioned in parallel spaced arrangement as the outermost layers of the composite panel 224, thus sandwiching therebetween the remaining eight panel layers. According to the illustrated architecture, the first reflector layer 246A is sandwiched between and attached directly to the uppermost exterior layer 240A and the first bonding layer 244A. The sunshade layer 248 is sandwiched between and attached directly to the first bonding layer 244A and an outward-facing surface of the central structural reinforcement layer 242. The second reflector layer 246B is adhered to an inward-facing surface of the central structural reinforcement layer 242 via the second bonding layer 244B and to an outward-facing surface of the low-k layer 250 via the third bonding layer 244C. The low-k layer 250 is sandwiched between and attached directly to the lowermost exterior layer 240B and the third bonding layer 244C.

Figure 4:
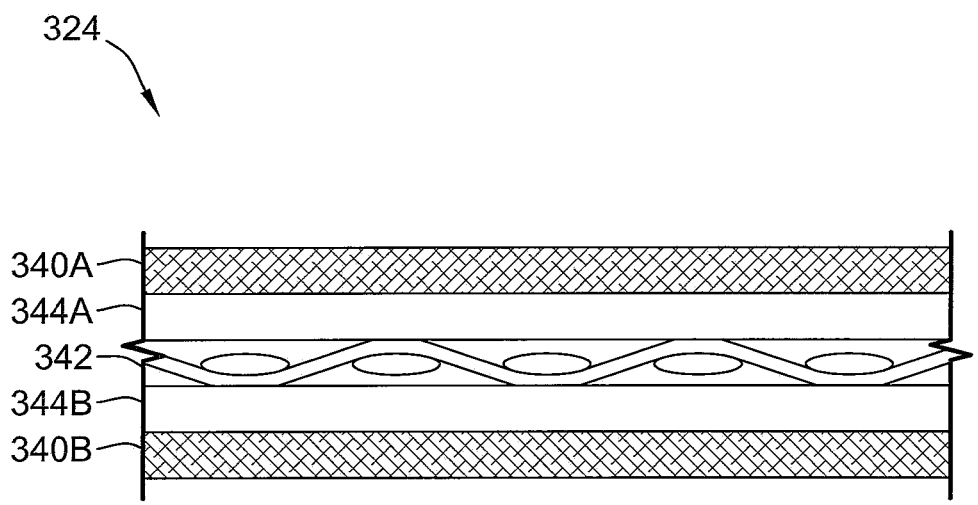
FIG. 4 is a schematic, side-view illustration of a select section of a representative 5-layer laminated transparent composite roof panel with localized FRP reinforcements in accord with aspects of the disclosed concepts.

FIG. 4 presents a third non-limiting example of a structural transparent composite panel 324 that may be utilized as a body panel or roof panel for an automobile, such as vehicle 10 of FIG. 1. As mentioned above, the composite panel 324 may include any of the features and options described above and below with respect to the other representative composite panels 124, 224, 424, and vice versa. In this example, the composite panel 324 is a multilayer sandwich-type construction composed of at least five (5) layers: uppermost and lowermost exterior layers 340A and 340B, respectively; a central structural reinforcement layer 342; and two bonding layers 344A and 344B each bonding a respective face of the central structural reinforcement layer 342 to a respective one of the exterior layers 340A and 340B.

Central structural reinforcement layer 342 may have a thickness of about 1 mm to about 6 mm or, for at least some configurations, about 2-4 mm, and may comprise an FRP composite structure with a dry fabric core or, alternatively, a multidirectional pre-impregnated (prepreg) layup. Each exterior layer 340A and 340B may be a chemically strengthened glass or a soda-lime glass layer with an individual thickness of about 0.5 mm to about 2.1 mm, which results in a total glass thickness of about 1.0 mm to about 2.2 mm and a total panel thickness of about 5 mm to about 9.8 mm. The structural reinforcement, exterior, and bonding layers may be coextensive with one another and with the panel 324. The fibers contained in the structural reinforcement layer 342, however, are localized to one or more select regions. The structural transparent composite panel 324 may consist essentially of the five illustrated layers, ordered from top-to-bottom in the sequence that is presented in FIG. 4.

Figure 5:
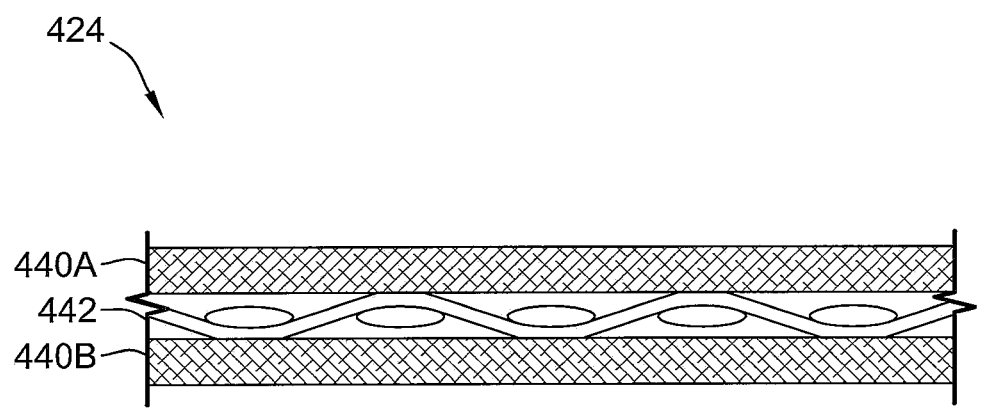
FIG. 5 is a schematic, side-view illustration of a select section of a representative 3-layer laminated transparent composite roof panel with localized FRP reinforcements in accord with aspects of the disclosed concepts.

With reference next to FIG. 5, there is shown a fourth non-limiting example of a structural transparent composite panel 424 that may be utilized, for example, as a body panel or roof panel for an automobile. In this example, the composite panel 424 is a multilayer sandwich-type construction composed of at least three (3) layers: uppermost and lowermost exterior layers 440A and 440B, respectively; and a central structural reinforcement layer 442 sandwiched between and attached directly to the exterior layers 440A and 440B. Similar to the architecture of FIG. 4, each exterior layer 440A and 440B of FIG. 5 may include a chemically strengthened glass, a tempered glass, a soda-lime glass, an alkali-aluminosilicate sheet glass, etc., with an individual thickness of about 0.7 mm to about 2.1 mm, which results in a total glass thickness of about 1.4 mm to about 2.2 mm and a total panel thickness of about 3.4 mm to about 8.2 mm. The individual layers may be coextensive with one another and the panel, whereas the fibers in the structural reinforcement layer is localized to one or more select regions. The structural transparent composite panel 424 may consist essentially of the three illustrated layers, ordered from top-to-bottom in the sequence that is presented in FIG. 5.

For any of the disclosed panels, vehicles, and methods, a structurally reinforcing FRP layer fiber may employ any suitable fiber type, including: carbon fiber, glass fiber, basalt fiber, Kevlar fiber, ultra-high molecular weight polyethylene fibers, spider silk fibers, polypropylene fibers, boron fibers, or any combination thereof. As yet a further option, the fiber volume fraction may locally be high, such that it resembles a structural composite (e.g., with local fiber volume fraction up to 70 vol %), yet globally may be less than 1 vol % of the entire structure. Fiber orientation may be constructed using unidirectional fiber tows, spread tows, tapes, unidirectional fabrics using tow placement methods, or any combination thereof. It is also possible to weave fabrics using traditional woven or non-crimp fabrics, such as plain, twill, harness satins, quasi-isotropic layups, etc.

For any of the disclosed panels, vehicles, and methods, it may be desirable to remove the low k-layer/coating from the multilayer laminate composite structure. As yet a further option, disclosed FRP layers may be constructed as a fiber-reinforced composite with a polycarbonate matrix, and with a PMMA layer (e.g., with UV absorbers and/or UV stabilizers) coated with a Silicone Hard Coat (e.g., for scratch resistance). Alternatively, the fiber-reinforced composite may be fibers within an acrylic matrix (e.g., with UV stabilizers and/or UV absorbers) which then has a hard coat. Optionally, the fiber-reinforced composite may employ a polycarbonate, nylon, or acrylic matrix without a hard coat.

FIGS. 6-13 are enlarged, perspective-view illustrations of representative vehicle roof assemblies employing respective structural transparent composite roof panels with distinctive localized reinforcement sections. As described above, each multilayer body panel includes one or more structural reinforcement layers that are fabricated, in whole or in part, from a high fiber volume fraction FRP material. Each structural reinforcement layer confines the fibers contained therein to a predefined topography in order to define a discrete plan-view region within the laminate stackup's plan-view profile. In so doing, these composite roof panels act as load-bearing structures with orthotropic properties and maximized "panoramic" optical transparency. While differing in appearance, any of the features and options described with reference to the composite roof panel 524 of FIG. 6 can be incorporated, singly or in any combination, into the composite roof panels 624, 724, 824, 924, 1024, 1124 and 1224 of FIGS. 7-13, and vice versa. In the same vein, each of the multilayer laminated roof panel constructions illustrated in FIGS. 6-13 may take on any of the structural transparent composite panel constructions illustrated in and described with respect to FIGS. 2-5.

Figure 6:
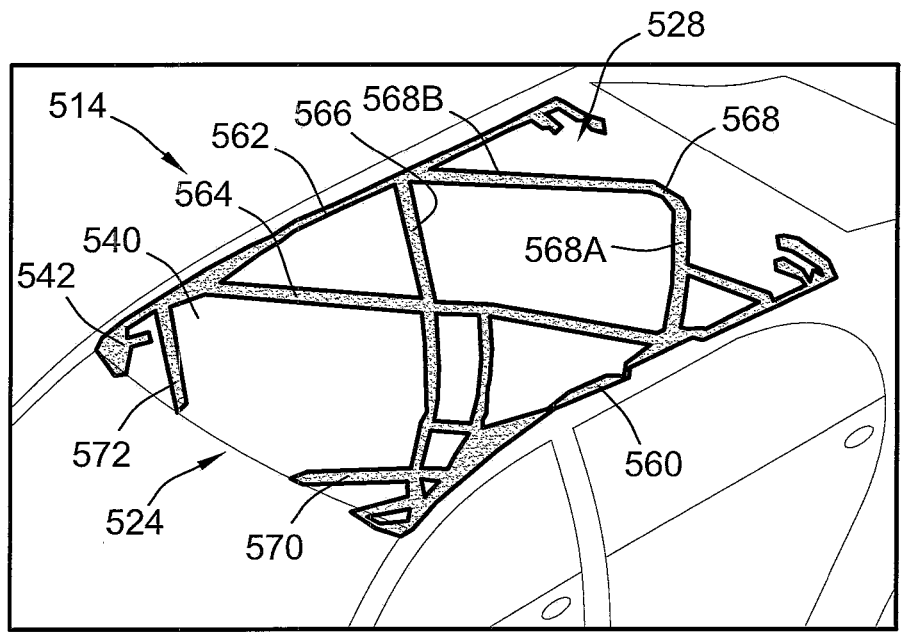
FIGS. 6-13 are elevated, perspective-view illustrations of representative vehicle roof assemblies highlighting various representative plan-view profiles for the localized FRP reinforcements of transparent composite roof panels in accord with aspects of the disclosed concepts.

Looking first at FIG. 6, an example of a vehicle roof structure 514 is shown that employs a structural transparent composite roof panel 524 with selectively located internal reinforcement features for increased structural integrity and improved optical transparency. The two layers of the multilayer composite roof panel 524 that are most readily visible in this particular view are the transparent yet rigid uppermost exterior layer 540 and the outermost (or lone) FRP structural reinforcement layer 542. Designated generally at 528 is a discrete plan-view region that is defined by the fibers contained in the structural reinforcement layer 540 within the composite panel's plan-view profile. Similar to the reinforcement section 28 of FIG. 1, for example, the plan-view region 528 of FIG. 6 is translucent or opaque and arranged in a diamond lattice-shaped pattern that demarcates numerous substantially transparent sections extending vertically through the roof panel 524. In this particular example, the plan-view region 528 is generally composed of assorted intersecting rails and crossmembers, including a pair of laterally spaced side rails 560 and 562 that extend along the fore-aft length of the multilayer body panel 524. Three transverse crossmembers 564, 566 and 568 extend between and connect the side rails 560, 562. As will become apparent from the discussion of FIGS. 6-13, the number, shape, size, and arrangement of the side rails and crossmembers may be varied from that which are shown in the drawings.

Port and starboard side rails 560 and 562 of the plan-view region 528 are generally parallel to each other and respectively located at opposing left and right sides of the multilayer composite roof panel 524. The representative side rails 560, 562 of FIG. 6 have elongated, curvilinear shapes (in both plan view and side view; shown as mirrored images of each other) that extend substantially the entire fore-aft length of the roof panel 524. Each of the three crossmembers 564, 566, 568 is obliquely angled with respect to the side rails 560, 562 e.g., projecting at an angle of about 15-85 degrees from one or both rails. The first and second crossmembers 564, 566 intersect at the center of the composite roof panel 524 to define an X-shaped pattern. Contrastingly, a third crossmember 568 is longitudinally spaced from the other crossmembers 564, 566 and located proximate the aft end of the panel 524. The third crossmember 568 includes a left hand-side (first) angled crossmember section 568A and a right hand-side (second) angled crossmember section 568B that project from respective ones of the side rails 560, 562 and intersect at the center of the composite roof panel 524 to define a V-shaped pattern. Forward-projecting port and starboard angled extensions 570 and 572, respectively, protrude at oblique angles from the side rails 560, 562, and terminate at the forward end of the panel 524. While not individually labelled, the plan-view region 528 of the structural reinforcement layer(s) 542 includes assorted other branches, extensions, and angled crossmember segments.

Figure 7:
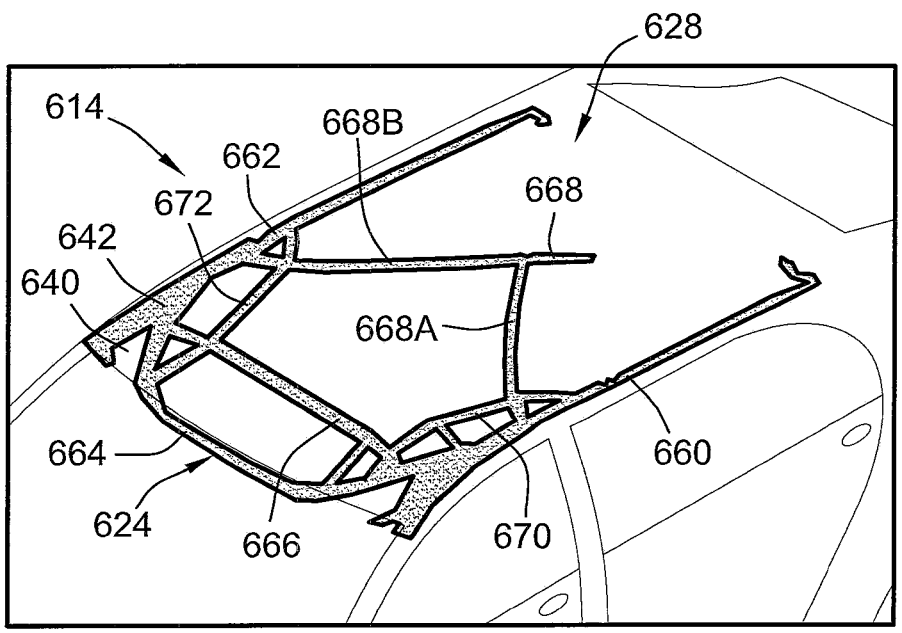

FIG. 7 illustrates another example of a vehicle roof structure 614 that employs a structural transparent composite roof panel 624 that is fabricated with selectively located internal reinforcement features to provision increased structural integrity and improved optical transparency. Similar to the view of FIG. 6, the uppermost exterior layer 640 and the outermost structural reinforcement layer 642 are most readily visible in the view of FIG. 7. The fibers contained in the structural reinforcement layer 640 defines a discrete plan-view region 628 within the composite panel's plan-view profile. The plan-view region 628 of FIG. 7 is translucent or opaque and arranged in a pentagonal pattern that demarcates numerous substantially transparent sections extending vertically through the roof panel 624. Comparable to the example of FIG. 6, the plan-view region 628 of FIG. 7 includes a pair of laterally spaced side rails 660 and 662 that extend along the fore-aft length of the multilayer roof panel 624. Three transverse crossmembers 664, 666 and 668 extend between and connect the two side rails 660, 662. In an alternative configuration, the third crossmember 668 may be eliminated from the reinforcement structure's topography and, optionally, replaced with a single crossmember section (e.g., a left hand-side angled crossmember section 668A) that may be shifted towards the aft end of the roof panel 624.

Driver-side and passenger-side rails 660 and 662, respectively, of the plan-view region 628 are generally parallel to each other and respectively located at opposing left (port) and right (starboard) sides of the multilayer composite roof panel 624. Both representative side rails 660, 662 have elongated, curvilinear shapes, which are shown as mirrored images of each other in FIG. 7, that extends substantially the entire fore-aft length of the roof panel 624. The lateral width of each rail 660, 662 varies along the fore-aft length of the panel 624. Forward edges of the rails 660, 662 may originate at and adjoin the vehicle's front windshield, whereas rearward edges of the rails 660, 662 may terminate at and adjoin the vehicle's rear glass.

With continuing reference to FIG. 7, the first crossmember 664 is located proximate the forward end of the composite roof panel 624 and has a generally U-shaped plan-view profile that extends substantially the entire width of the panel 624. Located between the first and third crossmembers 664, 668 is a second crossmember 666 that is substantially orthogonal to the side rails 660, 662. This crossmember 666 has an elongated, rectilinear shape that extends substantially the entire width of the composite roof panel 624. Unlike the second crossmember 666, the third crossmember 668 is obliquely angled with respect to the side rails 660, 662. The third crossmember 668 is longitudinally spaced from both the first and second crossmembers 664, 666, localized to a central region of the panel 524 topography. Similar to crossmember 568, the third crossmember 668 of FIG. 7 includes a left hand-side (first) angled crossmember section 668A and a right hand-side (second) angled crossmember section 668B that project from respective ones of the side rails 660, 662 and intersect along a longitudinal centerline of the composite roof panel 624 to define a V-shaped pattern. Arched crossmember extensions 670 and 672 protrude at oblique angles from the side rails 660, 662, and intersect with all three crossmembers 664, 666, 668. While not expressly labelled or described, the plan-view region 628 may include additional rails, branches, extensions, crossmembers and crossmember segments.

Figure 8:
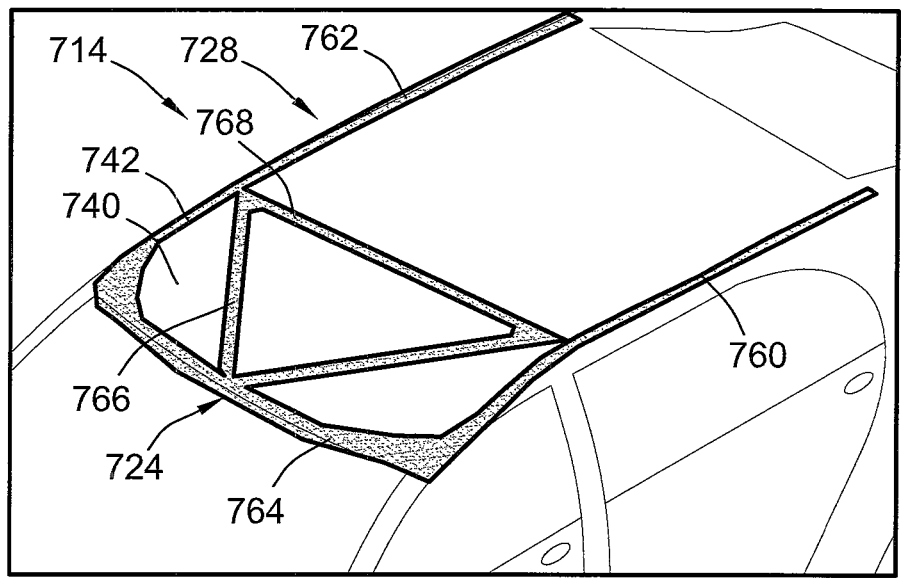

FIG. 8 illustrates another example of a vehicle roof structure 714 that employs a structural transparent composite roof panel 724, which is fabricated with selectively located internal reinforcement features. As with all of the multilayer composite panels described hereinabove, the roof panel 724 of FIG. 8 includes at least one exterior layer 740 and at least one structural reinforcement layer 742. Fibers contained in the structural reinforcement layer or layers 740 define a discrete plan-view region (localized topology) 728 within the plan-view profile of the composite roof panel 724. In this instance, the plan-view region 728 is translucent or opaque and arranged in a U-shaped pattern superposed with a triangular crossmember arrangement. Plan-view region 728 of FIG. 8 separates four substantially transparent sections that extend through the roof panel 724.

The plan-view region 728 of FIG. 8 includes or consists essentially of five intersecting segments: first and second side rails 760 and 762 that extend along the fore-aft length of the multilayer body panel 724; and three transverse crossmembers 764, 766 and 768 that extend the lateral width of the multilayer body panel 724, sandwiched between and connecting the two side rails 760, 762. The side rails 760 and 762 are generally parallel to each other and respectively located at opposing left and right sides of the multilayer composite roof panel 724. The first crossmember 764 is located at the forward end of the composite roof panel 724 and has a curvilinear plan-view profile that extends substantially the entire width of the panel 724. The second crossmember 766 is obliquely angled with respect to the side rails 760, 762 and includes first and second angled crossmember sections (not individually labelled) that each projects from a respective side rail 760, 762 and intersect to define a V-shaped pattern. The third crossmember 768 is longitudinally spaced from the forward end of the panel 724 and oriented substantially orthogonal to the side rails 760, 762. Alternative configurations may eliminate the third crossmember 768 from the discrete plan-view region 728, leaving the V-shaped second crossmember 766. Optionally, both the second and third crossmembers 766, 768 may be eliminated, leaving the U-shaped geometry of the first crossmember 764 intersecting with the side rails 760, 762.

Figure 9:
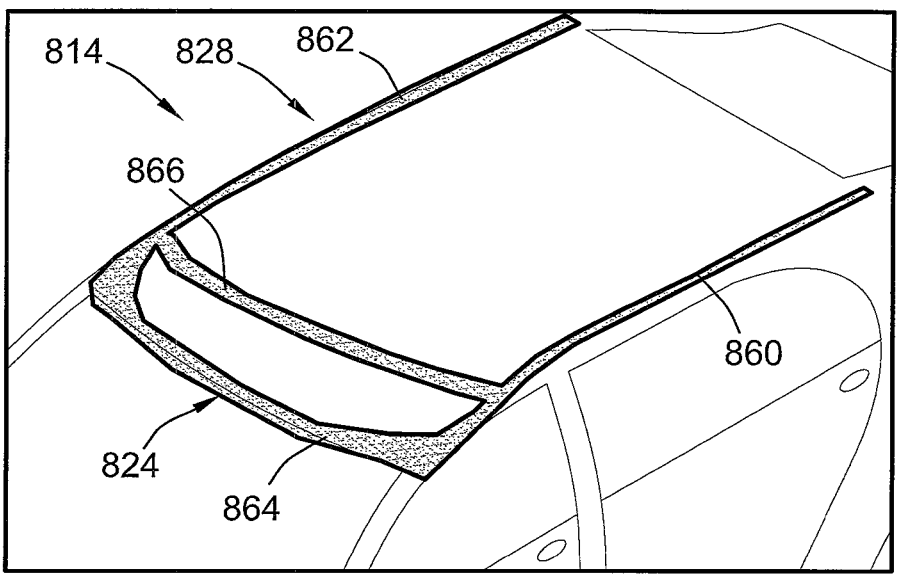

FIG. 9 illustrates yet another representative vehicle roof structure 814 that employs a structural transparent composite roof panel 824. The composite roof panel 824 may be structurally equivalent to the composite roof panel 724 of FIG. 8, except that roof panel 824 of FIG. 9 has a fiber-defined, plan-view region 828 that includes or consists essentially of four intersecting segments: first and second side rails 860 and 862 that extend along the fore-aft length of the multilayer body panel 824; and two transverse crossmembers 864 and 866 that extend the lateral width of the multilayer body panel 824, sandwiched between and connecting the two side rails 860, 862. Moreover, side rails 860 and 862 may be identical to side rails 760 and 762, and crossmember 864 may be identical to crossmember 764. By way of contrast, however, the second crossmember 866 may have a similar shape, a similar size and/or a similar orientation as the third crossmember 768, but located closer to the forward end of the panel 824 and the first crossmember 864.

Figure 10:
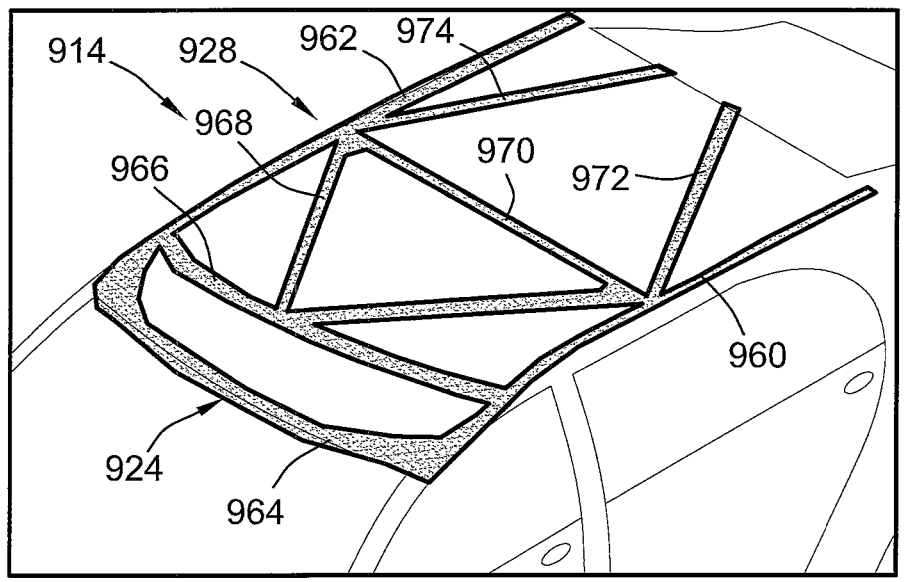

FIG. 10 illustrates one more example of a vehicle roof structure 914 that employs a structural transparent composite roof panel 924. The composite roof panel 924 of FIG. 10 has a reinforcement layer with a fiber-defined, plan-view region 928 that includes or consists essentially of eight segments: first and second side rails 960 and 962 that extend along the fore-aft length of the multilayer body panel 924; four transverse crossmembers 964, 966, 968 and 970 that extend the lateral width of the multilayer body panel 924, sandwiched between and connecting the two side rails 960, 962; and two rearward-projecting angled extensions 972 and 974 that protrude at oblique angles from the side rails 960, 962, and terminate at the aft end of the panel 924. Similar to the roof panels 724 and 824, side rails 960 and 962 of FIG. 10 may be identical to side rails 760, 860 and 762, 862 of FIGS. 8 and 9. In the same vein, crossmember 964 may be structurally identical to crossmembers 764 and 864, and crossmember 966 may be structurally identical to crossmember 866. Third crossmember 968, on the other hand, is sandwiched between second and fourth crossmembers 966 and 970 and includes two angled crossmember section that project at oblique angles from the side rails 960 and 962 and intersect with crossmember 970 to define a triangular-shaped profile. Angled extensions 972 and 974 also intersect with crossmember 970, defining an isosceles-trapezoid shaped profile.

Figure 11:
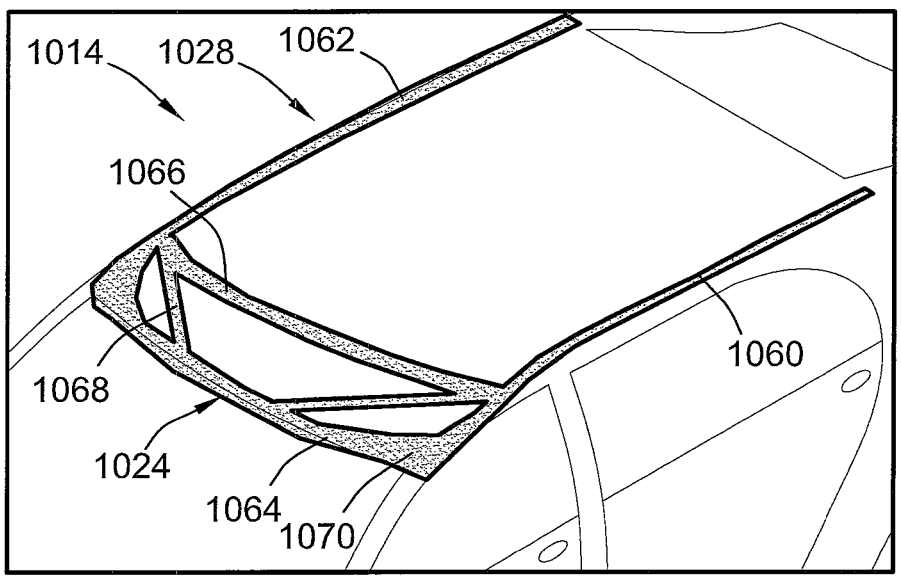

FIG. 11 illustrates a vehicle roof structure 1014 that employs a structural transparent composite roof panel 1024. The composite roof panel 1024 of FIG. 11 has a reinforcement layer with a fiber-defined, plan-view region 1028 that includes or consists essentially of six segments: first and second side rails 1060 and 1062 that extend along the fore-aft length of the multilayer body panel 1024; two transverse crossmembers 1064 and 1066 that extend the width of the multilayer body panel 1024, sandwiched between and connecting the two side rails 1060, 1062; and two forward-projecting angled extensions 1068 and 1070 that protrude at oblique angles from the side rails 1060, 1062, and terminate at the forward end of the panel 1024. As noted above, the rails, crossmembers and extensions illustrated in FIG. 11 may take on any of the features and options described above with respect to the rails, crossmembers and extensions illustrated in FIGS. 6-10, 12 and 13. In an alternative configuration, the second crossmember 1066 may be eliminated from the reinforcement structure's topography 1028.

Figure 12:
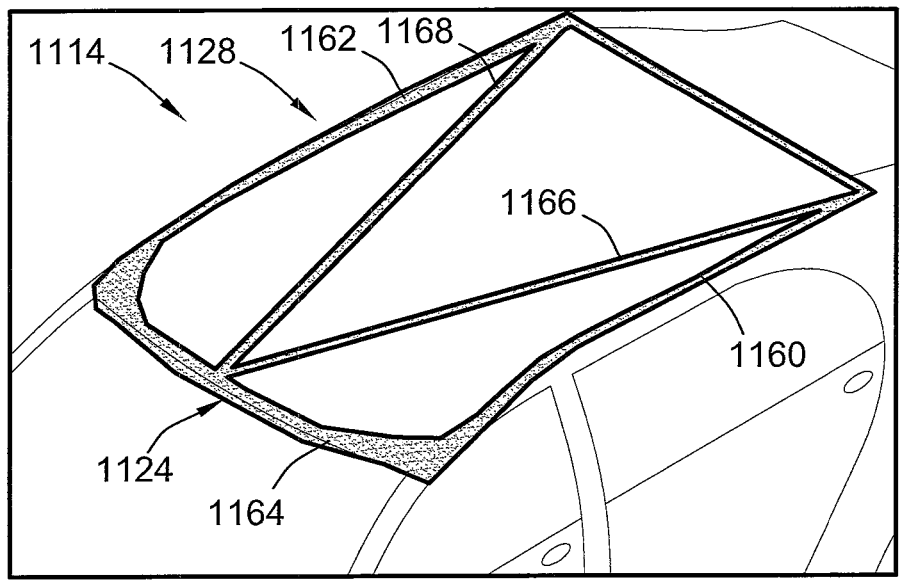

FIG. 12 illustrates a vehicle roof structure 1114 that employs a structural transparent composite roof panel 1124. The composite roof panel 1124 of FIG. 12 has a reinforcement layer with a fiber-defined, plan-view region 1128 that includes or consists essentially of five segments: first and second side rails 1160 and 1162 that extend along the fore-aft length of the multilayer body panel 1124; one transverse crossmember 1164 that extends the width of the multilayer body panel 1124 along the forward edge of the panel 1124, connecting the two side rails 1160, 1162; and two rearward-projecting angled extensions 1166 and 1168 that extend the entire length of the panel 1124, protruding at oblique angles from the transverse crossmember 1164, and terminating at the aft end of the panel 1124.

Figure 13:
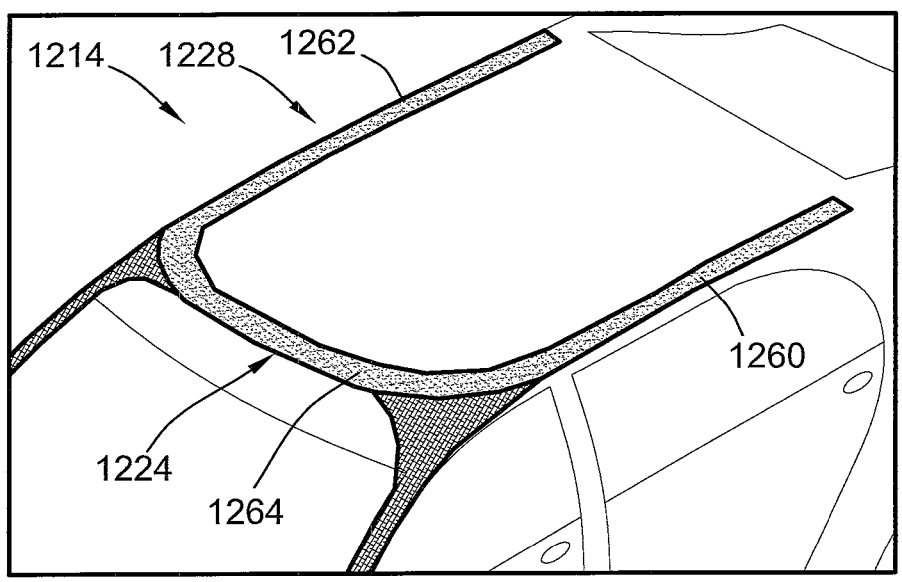

FIG. 13 illustrates a vehicle roof structure 1214 that employs a structural transparent composite roof panel 1224. One or more internal reinforcement layer(s) of the composite roof panel 1224 define a plan-view region 1228 that includes or consists essentially of three segments: two laterally spaced, longitudinally elongated side rails 1260 and 1262 that extend the entire fore-aft length of the multilayer body panel 1224; and one transverse crossmember 1264 that extends the entire width of the multilayer body panel 1224 along the forward edge of the panel 1224, connecting the two side rails 1260, 1262. The optional configuration allows for a modified a-pillar design that allows for the expansion of the size of front windshield concomitant with shifting the front header rearward along the fore-aft length of the vehicle body.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A multilayer body panel for a motor vehicle, the multilayer body panel comprising:
an exterior layer including a transparent rigid material; and
a structural reinforcement layer attached to the exterior layer, the structural reinforcement layer including a fiber-reinforced polymer (FRP) material containing fibers, wherein the multilayer body panel has a plan-view profile with a plan area with a length and width, the exterior and structural reinforcement layers extending substantially the entire length and width of the plan area, wherein the fibers contained in the structural reinforcement layer are localized to a discrete region within the plan area.

2. The multilayer body panel of claim 1, further comprising:
a bonding layer attached to the exterior layer and including a transparent adhesive material; and
a reflector layer attached directly to a first side of the bonding layer and including an infrared (IR) reflective material.

3. The multilayer body panel of claim 2, wherein the IR reflective material includes a metallic material and/or a dielectric material.

4. The multilayer body panel of claim 2, further comprising a sunshade layer attached directly to a second side of the bonding layer opposite the first side attached to the reflector layer, the sunshade layer including a solid-state, visible (VIS) light absorbing material.

5. The multilayer body panel of claim 4, wherein the solid-state, VIS-light absorbing material includes an electrochromic polymer-dispersed liquid crystal (PDLC) material and/or an indium tin oxide (ITO) based electrochromic material.

6. The multilayer body panel of claim 4, further comprising a low-k layer attached to the sunshade layer and including a dielectric material with a relatively small dielectric constant.

7. The multilayer body panel of claim 6, further comprising:
a second bonding layer including the transparent adhesive material and attached to the low-k layer; and
a second reflector layer including the infrared (IR) reflective material and attached directly to the second bonding layer.

8. The multilayer body panel of claim 7, further comprising a second structural reinforcement layer attached to the second reflector layer and including an FRP material, wherein the second structural reinforcement layer is localized to the same discrete region within the plan area.

9. The multilayer body panel of claim 8, further comprising third and fourth bonding layers each including the transparent adhesive material, wherein the layers of the multilayer body panel are stacked sequentially as: the exterior layer, the structural reinforcement layer, the third bonding layer, the reflector layer, the bonding layer, the sunshade layer, the second bonding layer, the second reflector layer, the low-k layer, the fourth bonding layer, and the second structural reinforcement layer.

10. The multilayer body panel of claim 1, wherein the transparent rigid material includes a scratch-resistant hard coat, the transparent adhesive material includes an ethylene-vinyl acetate (EVA) or polyvinyl butyral (PVB) optical bonding agent, and the FRP material includes a fiber-weave preform entrained within a thermoset or thermoplastic matrix.

11. The multilayer body panel of claim 1, further comprising:
a bonding layer attached to the exterior layer and including a transparent adhesive material;
a reflector layer attached directly to and sandwiched between the bonding layer and the exterior layer, the reflector layer including an infrared (IR) reflective material; and
a sunshade layer attached directly to and sandwiched between the bonding layer and the structural reinforcement layer, the sunshade layer including a solid-state, visible (VIS) light absorbing material.

12. The multilayer body panel of claim 11, further comprising:
a second bonding layer attached directly to the structural reinforcement layer on an opposite side thereof from the sunshade layer, the second bonding layer including the transparent adhesive material; and
a second reflector layer attached directly to the second bonding layer on an opposite side thereof from the structural reinforcement layer, the second reflector layer including the IR-reflective material.

13. The multilayer body panel of claim 1, further comprising:
a first bonding layer attached directly to and sandwiched between the exterior layer and the structural reinforcement layer;
a second exterior layer including the transparent rigid material; and
a second bonding layer attached directly to and sandwiched between the second exterior layer and the structural reinforcement layer, the second bonding layer including the transparent adhesive material.

14. The multilayer body panel of claim 2, wherein the transparent rigid material of the exterior layers includes a chemically strengthened glass or a soda-lime glass, the transparent adhesive material of the bonding layers includes an ethylene-vinyl acetate (EVA) or polyvinyl butyral (PVB) optical bonding agent, and the FRP material includes a fiber-weave preform entrained within a thermoset or thermoplastic matrix.

15. A motor vehicle comprising:
a vehicle body with a passenger compartment;
a prime mover mounted on the vehicle body and operable to propel the motor vehicle; and
a multilayer body panel mounted on the vehicle body and covering at least a portion of the passenger compartment, the multilayer body panel including:
an exterior layer including a transparent rigid material;
a bonding layer attached to the exterior layer and including a transparent adhesive material; and
a structural reinforcement layer attached to the bonding and exterior layers and including a fiber-reinforced polymer (FRP) material with a rigid polymer reinforced with fibers,
wherein the multilayer body panel has a plan-view profile with a plan area having a length and a width, the structural reinforcement, exterior, and bonding layers extending substantially the entire length and width of the plan area, and the fibers within the structural reinforcement layer localized to a discrete region within the plan area.

16. The motor vehicle of claim 15, further comprising a reflector layer attached directly to a first side of the bonding layer and including an infrared (IR) reflective material.

17. The motor vehicle of claim 16, further comprising a sunshade layer attached directly to a second side of the bonding layer opposite the first side attached to the reflector layer, the sunshade layer including a solid-state, visible (VIS) light absorbing reflective material.

18. The motor vehicle of claim 17, further comprising a low-k layer attached to the sunshade layer, the low-k layer including a dielectric material with a relatively small dielectric constant.

19. The motor vehicle of claim 18, further comprising:
a second bonding layer including the transparent adhesive material and attached to the low-k layer; and
a second reflector layer including the infrared reflective material and attached directly to the second bonding layer.

20. The motor vehicle of claim 19, further comprising a second structural reinforcement layer attached to the second reflector layer and including the fiber-reinforced polymer (FRP) material, wherein the second structural reinforcement layer is localized to the same discrete region within the plan area.

* * * * *